United States Patent [19]

Kerbeck et al.

[11] 4,000,184

[45] Dec. 28, 1976

[54] PRODUCTION OF CATIONIC CONDENSATION PRODUCTS

[75] Inventors: Alfred Kerbeck, Bad Duerkheim; Eberhard Luecke, Ludwigshafen; Erich Renauer, Ludwigshafen; Guenter Reuss, Ludwigshafen, all of Germany

[73] Assignee: BASF Aktiengesellschaft, Ludwigshafen (Rhine), Germany

[22] Filed: Jan. 8, 1975

[21] Appl. No.: 539,418

[30] Foreign Application Priority Data

Jan. 25, 1974 Germany .......................... 2403443

[52] U.S. Cl. .......................... 260/482 R; 260/69 N
[51] Int. Cl.² ...................................... C08G 12/22
[58] Field of Search ...................... 260/482 R, 69 N

[56] References Cited

UNITED STATES PATENTS

| 2,064,876 | 12/1936 | Bender | 260/69 N |
|---|---|---|---|
| 2,208,290 | 7/1940 | Glycofrides | 260/69 N |
| 2,320,817 | 6/1943 | D'Alelio | 260/69 N |
| 2,405,863 | 8/1946 | Treboux | 260/69 N |
| 2,497,074 | 2/1950 | Dudley | 260/69 N |
| 3,106,541 | 10/1963 | Lipowski | 260/69 N |
| 3,490,859 | 1/1970 | Soiron | 8/74 |
| 3,490,860 | 1/1970 | Soiron | 8/74 |
| 3,840,486 | 10/1974 | Dumas | 260/69 N |

*Primary Examiner*—Anton H. Sutto
*Assistant Examiner*—Michael Shippen
*Attorney, Agent, or Firm*—Johnston, Keil, Thompson & Shurtleff

[57] ABSTRACT

Condensation products are prepared from carboxamides, formaldehyde, dicyandiamide and ammonium and/or amine salts in a single process step. After the end of the exothermic reaction the reaction mixture is heated for from 30 minutes to 5 hours at a temperature of from 70° to 100° C.

10 Claims, No Drawings

PRODUCTION OF CATIONIC CONDENSATION PRODUCTS

The invention relates to a new process for the manufacture of cationic condensation products based on a reaction of a carboxamide, formaldehyde, dicyandiamide and a neutralization product of ammonia or an amine in a single reaction stage.

German Laid-Open Specification No. G 2105 IVb/39c discloses a process for the manufacture of water-soluble or acid-soluble condensation products from urea, dicyandiamide, an ammonium salt of a mineral acid and formaldehyde by reaction of the said substances in a single stage reaction. According to the said literature reference the products obtained are condensation products whose molecular weight is subject to considerable fluctuation; this is a disadvantage which means in particular that these products are quite useless for many applications, for example as paper sizes.

An attempt is made according to German Patent No. 1,078,768 to obviate this disadvantage by subdividing the process into two stages in which formaldehyde is first condensed with a carboxamide such as urea and the condensation product obtained is then further condensed with dicyandiamide and an ammonium salt with or without further formaldehyde.

The advantage of the latter method is that the products are obtained in a fairly uniform molecular weight so that they are outstandingly suitable as sizes and especially as fixing agents for dyes and tanning agents. A disadvantage is the expenditure of work which inevitably accompanies the two-stage method. Attempts have therefore been made in industry to revert to a one-stage process although having regard to previous teaching this would not appear to be particularly reasonable. The difficulties to be feared in the one-stage method are implicit in the fact that in the one-stage reaction there is generally a very large amount of heat evolved which becomes evident in extremely high reaction rates. In the one-stage method one is forced to carefully monitor the temperature and pressure conditions in the reaction vessels so that there would be no danger of the occurrence of uncontrolled reaction or even explosions.

It is an object of this invention to review the one-stage method so that it is made useful industrially and an economically optimized process results which permits the production of products having all the properties required.

We have found that condensation products based on a carboxamide, dicyandiamide, an ammonium and/or amine salt and formaldehyde are surprisingly obtained with uniform molecular weight in a single-stage method by accurately maintaining certain parameters in the reaction.

The process for the manufacture of condensation products by reaction of a carboxamide, formaldehyde, dicyandiamide and an ammonium and/or amine salt comprises mixing at ambient temperature 1 molar proportion of a neutralization product having a pH of from 6 to 8 which has been obtained from at least one carboxylic acid having a pKa value of not less than 3.5 and ammonia and/or at least one lower aliphatic amine with from 0.8 to 1.4 molar proportions of at least one carboxamide and from 0.8 to 1.4 molar proportions of dicyandiamide, then adding from 3.2 to 4.5 molar proportions of formaldehyde per molar proportion of dicyandiamide and after the maximum temperature occasioned by the spontaneous reaction and a constant pH have been achieved allowing the reaction to continue for from 30 minutes to 5 hours at from 70° to 100° C.

The condensation products obtained according to the invention have very uniform molecule sizes and are outstandingly useful as fixing agents for dyes in the paper industry and also as paper sizes.

The starting materials for the process according to the invention are neutralization products derived from carboxylic acids as defined above with ammonia and/or aliphatic amines; these products should have a pH of from 6 to 8 and preferably of from about 6.5 to 7.5.

The relevant amines are lower aliphatic primary amines preferably having from one to five carbon atoms per alkyl. It is preferred however to use ammonia itself.

The carboxylic acids used according to the invention are conveniently saturated aliphatic carboxylic acids of one to five carbon atoms, for example formic acid, acetic acid, propionic acid or butyric acid; formic acid and mixtures of the said carboxylic acids are preferred.

Examples of carboxamides to be used according to the invention are formamide, acetamide, urea and derivatives of urea which are condensable with formaldehyde, for example N-alkylureas or N,N'-dialkylureas whose alkyl is methyl, ethyl, propyl or a group containing more carbon atoms. Reaction products of urea with alkanediols such as 1,3-propanediol or 1,4-butanediol (diurethanes) may also be used according to the invention.

Dicyandiamide is another of the essential starting products in the process according to the invention.

The formaldehyde to be used may be used as such, in the form of a from 20 to 50% aqueous solution (for example formalin) or in the form of substances which yield formaldehyde examples of which are paraformaldehyde and polyoxymethylene.

The reaction is conveniently carried out in aqueous solution. A standard procedure is to bring together 1 molar proportion of at least one of the neutralization products of ammonia and/or an amine defined above with from 0.8 to 1.4 molar proportions and preferably from 0.9 to 1.1 molar proportions of one of the said carboxamides and from 0.8 to 1.4 and preferably from 0.9 to 1.1 molar proportions of dicyandiamide at ambient temperature, the mixture generally being present as a 40 to 75% aqueous solution, based on the sum of the said reactants. Then from 3.2 to 4.5 and preferably from 3.8 to 4.2 molar proportions of formaldehyde is added as quickly as possible in the form of a 20 to 50% aqueous solution and the mixture is left while being moved mechanically. The temperature rises spontaneously but not too rapidly to about 60° to 85° C and the pH which at first falls rapidly below 4 slowly reaches in this period a value of from 4.5 to 5.5 after which the reaction ceases. After this point has been reached (it being easily determined by control of the reaction temperature and the pH) the reaction mixture is heated and kept for from 30 minutes to 5 hours and preferably from 30 to 150 minutes at a temperature of from 70° to 100° C and preferably from 90 to 95° C. This course of the reaction and also the aftercondensation conditions are of great importance for the achievement of uniform molecule sizes. The scatter of the (mean) molecular weight should not be more than from ±10 to 30%. The reaction products usually have a degree of condensation which corresponds to a viscosity of from 15 to 150 mPa x second measured at 20° C in a 45% aqueous solution.

The condensation products obtained may be characterized by the said viscosity (degree of condensation) or by the mean molecular weight which can be calculated therefrom or by the acid number or infrared or X-ray spectra.

The products obtained may be immediately used as aqueous solutions but may also be converted into rapidly soluble powder for example by spray-drying or on dryer rolls. The condensaton products are used in an amount of from 0.2 to 1.5% and preferably of from 0.5 to 1.0% by weight based on dry paper pulp. The following Examples illustrate the manufacture of the products as well as their use as fixing agents for dyes in the paper industry and as paper sizes.

EXAMPLE 1

1 molar proportion of ammonia in the form of a 25% aqueous solution is first mixed in a stirred vessel with 1 molar proportion of urea and then while removing some of the heat the whole is neutralized to a pH of from 6.5 to 7.0 with formic acid. 1 molar proportion of dicyandiamide is then introduced followed as quickly as possible by 4 molar proportions of formaldehyde solution (40%) with intense cooling. There is a spontaneous evolution of heat. The rapidly rising temperature is accompained by a fall in the pH to a value below 3.8 which after secondary reactions have proceeded for a few minutes rises again to about 5.0 at which the entire reaction ceases. The temperature is from 60° C to 80° C according to the intensity of cooling. The whole is now heated rapidly to 95° C, this temperature is maintained for 40 minutes, and the whole is cooled to about 30° C and neutralized with caustic soda solution or sodium carbonate solution to a pH of from 7.0 to 7.2. The resin solution obtained has the following characteristics:

appearance: colorless, water-clear solution;
solids content: about 45% by weight;
pH: from 6.8 to 7.2;
viscosity: from 35 to 45 mPa × second at 20° C in a Hoeppler rheoviscometer.

In application tests several samples (according to the above Example) were tested to eliminate error. The proportions of the products of Example 1 can be illustrated by the following tests:

a. Fixing acid dyes in paper pulp:
50 mg of the resin obtained according to Example 1 (reckoned as solid) and then 100 mg of an acid dye (Orange II liquid, i.e. a liquid formulation of the dye C.I. No. 15510, Acid Orange 7) are added in the form of dilute solutions while stirring to a suspension of 5 g of bleached sulfite cellulose. The whole is stirred for another 15 minutes, then diluted with drinking water to 2 liters and a sheet of paper is prepared by a conventional method by dewatering in a laboratory sheet-forming unit. The filtrate thus obtained (wire water) is collected and the amount of dye contained therein and therefore not fixed in the paper is determined photometrically. The color intensity of the sheet of paper is determined, after drying, according to DIN 55,234 (measurement of the reflectance and conversion to the K/S value approximately proportional to the color strength).

The values (dye content in wire water, K/S value) which are obtained under otherwise identical conditions in fixing with aluminum sulfate (150 mg = 3% based on dry fibrous material) serve for comparison.

The following results are obtained in testing a number of resin samples from 12 different batches according to Example 1:

| Sample No. | percentage of dye not fixed | color strength (K/S value) |
|---|---|---|
| 1 | 51 | 1.108 |
| 2 | 52 | 1.132 |
| 3 | 52 | 1.148 |
| 4 | 52 | 1.132 |
| 5 | 51 | 1.200 |
| 6 | 52 | 1.240 |
| 7 | 39 | 1.280 |
| 8 | 51 | 1.480 |
| 9 | 51 | 1.132 |
| 10 | 50 | 1.200 |
| 11 | 50 | 1.480 |
| 12 | 56 | 1.093 |
| & Comparison: | | |
| 3% aluminum sulfate | 65 | 0.830 |
| Blank: no addition | 90 | 0.113 | b. Fixing rosin size (neutral sizing):
Dilute aqueous solutions of 50 mg of rosin size, 50 mg of aluminum sulfate and 50 mg of the resin obtained according to the invention (reckoned as solid) are added consecutively to a suspension of 5 g of bleached sulfite cellulose in 150 ml of water while stirring. The whole is stirred for another 15 minutes, then diluted with drinking water to 2 liters and a sheet of paper is formed in conventional manner by dewatering on a laboratory sheet-forming unit.

The degree of sizing of the sheet after drying and conditioning (20° C, 65% relative humidity) is determined according to Cobb (determination in g/m$^2$ of the amount of water absorbed under defined conditions). Since the absolute value obtained is affected by various factors (condition of the fibrous material, of the water, etc.) there is provided as a standard of comparison in each case a second sheet in which fixing of the rosin size is carried out with 50 mg of a commercial resin (prepared according to German Pat. No. 1,078,768). In this way the differences in the Cobb values are determined.

The following Cobb differences are obtained in testing a number of resin samples according to the invention from various batches according to Example 1:

| Sample No. | Cobb value difference (compared with samples with 3% of aluminum sulfate) |
|---|---|
| 1 | −1 |
| 2 | −3 |

-continued

| Sample No. | Cobb value difference (compared with samples with 3% of aluminum sulfate) |
|---|---|
| 3 | −3 |
| 4 | −4 |
| 5 | ±0 |
| 6 | −1 |
| 7 | −3 |
| 8 | ±0 |
| 9 | −5 |
| 10 | ±0 |
| 11 | −1 |
| 12 | ±0 |

It will be seen that the Cobb values when resins according to the invention (Example 1) are used are on an average more favorable by 1.3 units.

EXAMPLE 2

It is inherent in the type of resin claimed that the amount of carboxylic acid neutralization product used per mole of carboxamide and dicyandiamine may be varied within the stated limits and exerts a certain influence on the characteristics of the resin obtained.

In the presence in each case of 1 molar proportion of urea in the solutions A, B and C increasing amounts of ammonia (25% aqueous solution) per mole of urea are neutralized with formic acid to a pH of 7 while cooling, 1 molar proportion of dicyandiamide is introduced and then reacted with 4 molar proportions of formaldehyde and the same afterreaction conditions are maintained. The solutions obtained after cooling and neutralization to a pH of 7.0 to 7.2 are concentrated to a solids content of 45% and have the following viscosities measured at 20° C:

Solution A = 155 mPa × second
Solution B = 90 mPa × second
Solution C = 30 mPa × second.

The molar proportion of ammonia used per molar proportion of urea in each case is as follows:
Solution A: 0.75
Solution B: 1.0
Solution C: 1.25.

Tests in industrial use are carried out as described in Example 1:

| Solution | A | B | C |
|---|---|---|---|
| (a) Fixing acid dyes: | 55 | 47 | 55 |
| % dye in waste water | 1.197 | 1.335 | 1.320 |
| K/S value | | | |
| (b) Rosin size fixing: (Cobb value) | | | |
| sample | — | 29 ⎫ | — |
| | | ⎬ difference = 1 | |
| comparison | — | 28 ⎭ | — |

In another test of the sizing (ink flotation test) which was not however carried out numerically the three samples did not show any difference from one another or from the comparison sample.

Altogether the optimum effect is shown in the case of sample B.

EXAMPLE 3

It is inherent in the claimed type of resin that the amount of formaldehyde used per molar proportion of carboxamide and dicyandiamide can be varied within the specified limits and exerts an influence on the characteristics of the resin.

1 molar proportion of urea is mixed with 1 molar proportion of ammonia (25% aqueous solution) and neutralized while withdrawing heat with the same amount of formic acid to form a neutralization mixture having a pH of 7.0 to which 1 molar proportion of dicyandiamide is introduced and while continuing the cooling at 25° C increasing amounts of formaldehyde solutions containing 40% by weight of formaldehyde are added so that the solutions D to J contain the following molar ratios (based on urea):

| Solution: | D | E | F | G | H | I | J |
|---|---|---|---|---|---|---|---|
| Molar ratio | 3.5 | 3.6 | 3.7 | 3.8 | 3.9 | 4.0 | 4.2 |

After the reaction which proceeds spontaneously has ceased the whole is heated for another 35 minutes at 95° C; a pH of from 4.3 to 4.5 is reached. The whole is then cooled to 30° C and adjusted to pH 7.0 with caustic soda solution or sodium carbonate solution.

The 45% by weight resin solutions (obtained by evaporation) differ only slightly in the viscosity measured at 20° C within the claimed range of molar proportions.

| Solution: | D | E | F | G | H | I | J |
|---|---|---|---|---|---|---|---|
| Viscosity: | 19.2 | 19.7 | 21.6 | 22.7 | 22.7 | 23.4 | 27.9 |

(mPa per second in each case).

EXAMPLE 4

The dependence of the degree of condensation of the resin, represented by the viscosity, on the aftercondensation conditions to which it has been subjected is another feature of the claimed type of resin.

Three solutions K, L and M are adjusted to a pH of 7.0 with formic acid while removing heat in the presence of 1 molar proportion of urea and 1.2 molar proportions of ammonia (25% aqueous solution) in each case and then they are caused to react with 1 molar proportion of dicyandiamide and 3.9 molar proportions of formalin solution (40% aqueous solution of formaldehyde) and then heated to 95° C. Aftercondensation at 95° C is then carried on for periods of different lengths after which the pH given in the Table has been set up.

| Solution: | K | L | M |
|---|---|---|---|
| Aftercondensation | 0.15 | 1.0 | 5.0 hours |
| pH | 3.9 | 4.3 | 5.9 |

After the 45% by weight solutions have been cooled they are adjusted to pH 6.0 with caustic soda solution and have the following characteristics:

| Solution: | K | L | M |
|---|---|---|---|
| density at 20° C (Kg/l) | 1.198 | 1.194 | 1.184 |
| viscosity at 20° C (mPa × second) | 32 | 29 | 17 |
| Application tests (as in Example 1) | | | |

| Solution: | K | L | M |
|---|---|---|---|
| (a) Fixing acid dyes: | | | |
| % of dye in white water | 58 | 55 | 63 |
| color strength (K/S) | 1.105 | 1.030 | 1.895 |

-continued

| (b) Fixing rosin size: | | | |
|---|---|---|---|
| Sample | 17 | 16.5 | 19 |
| Comparison | 17 | 17 | 17 |
| Difference | ±0 | −0.5 | −2 |

EXAMPLE 5

It is also inherent in the claimed type of resin that formamide or acetamide may be used in addition to urea as the carboxamide.

Solution N is obtained by mixing 1 molar proportion of ammonium formate or a mixture of ammonia and formic acid neutralized to pH 7.0, 2 molar proportions of formamide and 1 molar proportion of dicyandiamide in the cold, then rapidly introducing formaldehyde solution, awaiting the spontaneously initiated reaction without cooling, heating to 95° C, allowing afterreaction to take place for 30 minutes at 95° C so that the pH rises to 3.0, cooling to 30° C and setting up a pH of 7.0 with caustic alkali solution.

A solution 0 is obtained by proceeding as for solution N but using 2 molar proportions of acetamide instead of formamide. The same parameters specified in solution N are observed for solution 0.

The solutions have the following characteristics:

| Solution: | N | O |
|---|---|---|
| Solids content % by weight | 45 | 45 |
| Density at 20° C kg/l | 1.193 | 1.188 |
| pH | 6.5 | 6.4 |
| viscosity at 20° C mPa/second | 14 | 20 |

Results analogous to those in Example 4 are obtained.

We claim:

1. A process for the manufacture of a condensation product from a carboxamide selected from the group consisting of formamide, acetamide, dicyandiamide, urea and derivatives of urea which are condensable with formaldehyde, formaldehyde, dicyandiamide and an ammonium and/or amine salt, which comprises reacting 1 molar proportion of a neutralization product having a pH of from 6 to 8 obtained from at least one saturated aliphatic carboxylic acid of 1 to 5 carbon atoms having a $pK_a$ value of not less than 3.5 and ammonia and/or at least one lower aliphatic amine with from 0.8 to 1.4 molar proportions of at least one said carboxamide and 0.8 to 1.4 molar proportions of dicyandiamide at ambient temperature, adding from 3.2 to 4.5 molar proportions of formaldehyde per molar proportion of dicyandiamide, and after the maximum temperature caused by the spontaneously initiated reaction and a constant pH have been achieved heating the whole for from 30 minutes to 5 hours at a temperature of from 70° to 100° C.

2. A process as set forth in claim 1 wherein the carboxylic acid used is formic acid.

3. A process as set forth in claim 1 wherein the reaction mixture is heated for from 30 to 150 minutes at a temperature of from 90° to 95° C for the afterreaction.

4. A process as set forth in claim 1 wherein the said neutralization product has a pH of from 6.5 to 7.5.

5. A process as set forth in claim 1 wherein the formaldehyde is used in the form of a from 20 to 50% by weight aqueous solution.

6. A process as set forth in claim 1 wherein the amount of carboxamide used is from 0.9 to 1.1 molar proportions and the amount of dicyandiamide is from 0.9 to 1.1 molar proportions, per molar proportion of the neutralization product.

7. A process as set forth in claim 1 wherein the amount of formaldehyde used is from 3.8 to 4.2 molar proportions per molar proportion of dicyandiamide.

8. A process as set forth in claim 1 wherein said carboxamide is a N-lower alkylurea.

9. A process as set forth in claim 1 wherein said carboxamide is an N,N-lower dialkylurea.

10. A process as set forth in claim 1 wherein said carboxamide is an N,N'-dialkyl urea whose alkyls are methyl, ethyl or propyl.

* * * * *